United States Patent Office 3,417,098
Patented Dec. 17, 1968

3,417,098
PHOSPHORYL DERIVATIVES OF
4-IMIDAZOLIDONES
Jésus Anatol, Paris, France, assignor to Etablissements
Kuhlmann, Paris, France
No Drawing. Filed Mar. 11, 1965, Ser. No. 439,068
Claims priority, application France, Mar. 13, 1964,
967,305
4 Claims. (Cl. 260—309.7)

ABSTRACT OF THE DISCLOSURE

Compounds related to phosphocreatine and phosphocreatinine, having anti-fatigue properties.

---

The present invention concerns improvements in and relating to phosphoryl derivatives.

In Patent No. 3,036,087 processes for the preparation of phosphocreatine and phosphocreatinine have been described in which dibenylphosphorylcyanamide, in the form of its sodium salt, is condensed with ethyl sarcosinate hydrochloride.

An object of the present invention is a generalisation of this condensation for the preparation of compounds which, in the form of free acids, have the following general formulae:

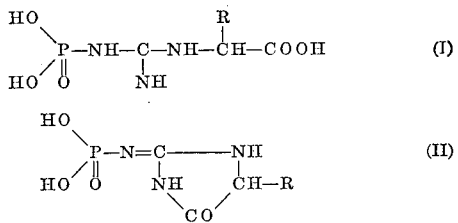

in which R represents an alkyl, aryl, aralkyl, carboxyalkyl, alkoxyalkyl or alkylthioalkyl group or a heterocyclic group.

According to the present invention a compound of the general formula:

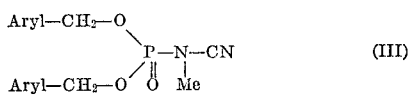

in which aryl represents an aryl nucleus, possibly substituted, and Me represents an alkali metal, is condensed, preferably in solution in an organic solvent with a salt of a mineral acid and an aminoacid ester of the general formula:

$$H_2N-CH-COOR' \quad (IV)$$
$$\qquad\quad |$$
$$\qquad\quad R$$

in which R represents an alkyl, aryl, aralkyl, carboxyalkyl, alkoxyalkyl or alkylthioalkyl group or a heterocyclic group and R' represents an alkyl group to form an intermediate compound of the general formula:

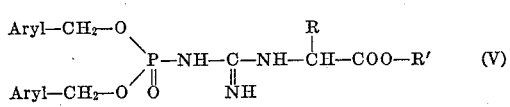

subjecting the compound of general Formula V to hydrolysis to form compounds of the formulae:

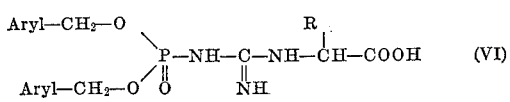

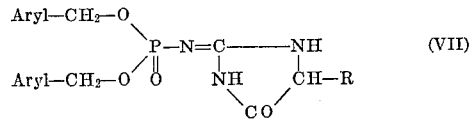

and subjecting the compounds of Formulae VI and VII to hydrolysis, preferably in the presence of palladium black.

The compounds of Formulae I and II and their salts may be used as medicines having anti-fatigue properties.

The compounds of Formulae I, II and V and their salts are novel compounds and are included within this invention.

The invention will be more clearly understood by reference to the following examples which are purely illustrative.

EXAMPLE 1

175 parts of dibenzyloxy-phosphoryl S-methyl isothiourea, 3000 parts of 80% alcohol, 26.8 parts of sodium carbonate and 54 parts of red mercury oxide are introduced into an apparatus provided with a mechanical stirrer and a condenser. The mixture is heated at the boil for 2 hours with vigorous stirring. After cooling, the mercury mercaptide is filtered off and the solvent is removed under reduced pressure. The residue is dissolved in 1000 parts of absolute alcohol, and 113 parts of ethyl aspartate hydrochloride are added to the solution obtained. The reaction mixture is heated under reflux for 2 hours, and allowed to cool and the sodium chloride is filtered off and the alcohol removed.

The residue is dissolved in 500 parts of ethanol. 120 parts of a solution of sodium hydroxide are added and the product allowed to crystallise, and the crystals are filtered off, washed with alcohol and dried in an oven at 80° C. until constant weight is obtained. 178 parts of the disodium salt of dibenzyloxy phosphoryl-α-guanidino-succinic acid of the formula:

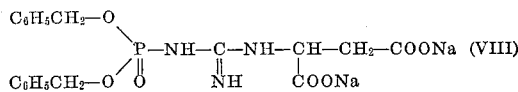

i.e. a yield of 74%, are thus obtained. This salt is recrystallised from an 87% solution of ethanol.

Analysis for $C_{19}H_{20}N_3O_7Na_2P$, Calculated: O, 45.79%; H, 4.65%; N, 8.43%; Na, 9.23%; P, 6.21%. Found: 45.88; H, 5.33%; N, 8.21%; Na, 8.99%; P, 6.06%. Molecular weight: 479.34.

EXAMPLE 2

81.5 parts of the compound of Formula VIII are dissolved in 640 parts of 80% ethanol and 34 parts of concentrated hydrochloric acid are added. An oily substance is formed and crystallises rapidly. It is filtered off, washed with 80% alcohol, then with water, and dried until the weight is constant 54 parts (i.e. a yield of 77%) are obtained of the compound of formula:

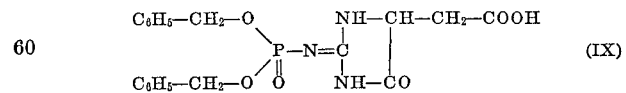

The product is recrystallised from 7 parts by volume of ethanol: M.P. 161–163° C.

Analysis for $C_{19}H_{20}N_3O_6P$, Calculated: P, 7.42%. Found: 7.47. Molecular weight: 417.35.

49 parts of the compound of Formula IX are dissolved in 120 parts of 2 N sodium hydroxide, and to this solution is added palladium black (prepared by hydrogenation of a mixture of 49 parts of carbon black, 375 parts of water and 2.5 parts of palladium chloride) and a stream of hydrogen at normal temperature and pressure is passed in;

4600 parts of hydrogen are absorbed in one hour. The catalyst is separated by filtration and washed 3 times with 50 parts of water each time. 540 parts of ethanol are added to the filtrate, and it is allowed to stand until the following day, then the product obtained is filtered off and washed with 76% alcohol, and has the formula:

$$\begin{array}{c}Na-O\\ \phantom{Na-}\diagdown\\ \phantom{Na-O}P-N=C\\ \phantom{Na-}\diagup\parallel\\ Na-O\phantom{-}O\end{array}\begin{array}{c}NH-CH-CH_2-COOH\\ |\\ \\ |\\ NH-CO\end{array} \quad (X)$$

In order to recrystallise it, the product is dissolved in the cold in 154 parts of water, 308 parts of alcohol are added, and the crystals are filtered off, washed in 66% alcohol, then in absoulte alcohol, and dried. 28 parts of recrystallised product i.e. a yield of 76%, are thus obtained.

Analysis for $C_5H_6N_3O_6Na_2P H_2O$. Calculated: P%, 10.35; Na%, 15.37. Found: P%, 10.31; Na%, 15.30. Molecular weight: 299.10.

EXAMPLE 3

82 parts of the compound of Formula IX are dissolved in 320 parts of water. As in Example 2 palladium black (prepared from 82 parts of animal charcoal, 410 parts of water and 4.1 parts of palladium chloride) is added and a stream of hydrogen is passed in. 5308 parts of hydrogen are absorbed in 45 minutes. The catalyst is separated by filtration, and it is washed 4 times with 60 parts of water each time. 2240 parts of ethanol are added to the filtrate. An oil separates which soon solidifies, and is filtered off, washed with alcohol and dried to constant weight. 48 parts (i.e. a yield of 88%) of the disodium salt of $\alpha$-phosphoryl guanidino-succinic acid are thus obtained of formula:

$$\begin{array}{c}Na-O\\ \phantom{Na-}\diagdown\\ \phantom{Na-O}P-NH-C-NH-CH-CH_2-COOH\\ \phantom{Na-}\diagup\parallel\phantom{-----}\parallel\\ Na-O\phantom{-}O\phantom{------}NH\end{array}\quad\begin{array}{c}COOH\\ |\\ \\ \end{array} \quad (XI)$$

To recrystallise, it is dissolved in the cold in 2 parts of water and 4 parts of ethanol are added:

Analysis for $C_5H_8N_3O_7Na_2P$. Calculated: P%, 10.35. Found: 10.71. Molecular weight: 299.

This compound may also be prepared by opening the ring of the compound described in Example 2 by means of a solution of dilute caustic soda according to the process described in Patent No. 3,036,087.

EXAMPLE 4

As in Example 1, the sodium salt of dibenzyloxyphosphoryl cyanamide is prepared from 175 parts of dibenzyl-oxy-phosphoryl-S-methyl-isothiourea. After removing the solvent, the residue is dissolved in 1000 parts of absolute ethanol, and to this solution are added 120 parts of ethyl glutamate hydrochloride dissolved in 250 parts of ethanol. The mixture is heated under reflux for 2 hours and the sodium chloride formed is filtered off in the cold. The filtrate is evaporated to dryness under reduced pressure. The residue is dissolved in 280 parts of ethanol, and 120 parts of a solution of sodium hydroxide, then 250 parts of acetone, are added. The product is allowed to crystallise and the precipitate filtered off, washed with an 80% mixture of alcohol and acetone and dried to constant weight. 157 parts of the disodium salt of dibenzyl-oxy-phosphoryl $\alpha$-guanidino-glutaric acid are thus obtained of formula:

$$\begin{array}{c}C_6H_5-CH_2-O\\ \phantom{C_6H_5-CH_2-}\diagdown\\ \phantom{C_6H_5-CH_2-O}P-NH-C-NH-CH\\ \phantom{C_6H_5-CH_2-}\diagup\parallel\phantom{------}\parallel\\ C_6H_5-CH_2-O\phantom{-}O\phantom{------}NH\end{array}\begin{array}{c}CH_2CH_2COONa\\ |\\ \\ \diagdown\\ COONa\end{array} \quad (XII)$$

i.e. a yield of 63.8%.

It is recrystallised from 7 parts by volume of 70% ethanol containing twice its volume of acetone.

Analysis for $C_{20}N_{22}N_3O_7Na_2P$. Calculated: C%, 48.68; H%, 4.80. Found: C%, 49.21; H%, 4.60. Molecular weight: 493.37.

EXAMPLE 5

69 parts of the compound of Formula XII are dissolved in 350 parts of water and 350 parts of ethanol are added together with 28 parts of 22° Bé. hydrochloric acid. The cyclic derivative begins to crystallise, and is subsequently filtered off, washed with 50% ethanol, then with water, and dried to constant weight. 41 parts of dibenzyl-oxy-phosphoryl-2-imino-imidazolidone 4-propanoic acid of formula:

$$\begin{array}{c}C_6H_5-CH_2-O\\ \phantom{C_6H_5-CH_2-}\diagdown\\ \phantom{C_6H_5-CH_2-O}P-N=C\\ \phantom{C_6H_5-CH_2-}\diagup\parallel\\ C_6H_5-CH_2-O\phantom{-}O\end{array}\begin{array}{c}NH-CH-CH_2-CH_2-COOH\\ |\\ \\ |\\ NH-CO\end{array} \quad (XIII)$$

are thus obtained, i.e. a yield of 68%. M.P. 153° C.

It is recrystallised from 6 parts of ethanol.

Analysis for $C_{20}H_{22}N_3O_6P$. Calculated: P%, 7.18. Found: 7.26. Molecular weight: 431.36.

43 parts of the compound of Formula XIII are dissolved in 100 parts of 2 N caustic soda, and to this solution are added 43 parts of 10% palladium black prepared as indicated in Example 2 and hydrogen at normal pressure and temperature. 4300 parts of hydrogen are fixed in 45 minutes.

The catalyst is separated, washed twice with 20 parts of water each time and 560 parts of ethanol are added to the filtrate. An oil separates. The next day the supernatant liquid is separated, made into a paste with methanol and left to crystallise. The precipitate is filtered off, washed with methanol and dried to constant weight. 24 parts of the disodium salt of 2-phosphorylimino-4-imidazolidone-propanoic acid of formula:

$$\begin{array}{c}Na-O\\ \phantom{Na-}\diagdown\\ \phantom{Na-O}P-N=C\\ \phantom{Na-}\diagup\parallel\\ Na-O\phantom{-}O\end{array}\begin{array}{c}NH-CH-CH_2-CH_2-COOH\\ |\\ \\ |\\ NH-CO\end{array} \quad (XIV)$$

which crystallises with 3 molecules of water, are thus obtained.

Analysis for $C_6H_8N_3O_6Na_2P 3H_2O$. Calculated, P%, 8.91; N%, 13.18. Found: P%, 8.99, 9.06; N%, 13.34, 13.43. Molecular weight: 349.

EXAMPLE 6

3.5 parts of the compound of Formula XIV are dissolved in 23.7 parts of N caustic soda. The mixture is gently heated for 10 minutes, cooled to 10° C. and 16 parts of N hydrochloric acid are added so that the liquid remains very slightly alkaline to phenolphthalein. It is filtered, the container is washed twice with 5 parts of water, and 200 parts of ethanol are added to the filtrate. An oil separates. The supernatant liquid is separated and mixed with methanol; the product gradually crystallises. It is filtered off, washed with ethanol and dried to constant weight. 2.85 parts of the disodium salt of phosphoryl $\alpha$-guanidino-glutaric acid of the formula:

$$\begin{array}{c}Na-O\\ \phantom{Na-}\diagdown\\ \phantom{Na-O}P-NH-C-NH-CH\\ \phantom{Na-}\diagup\parallel\phantom{------}\parallel\\ Na-O\phantom{-}O\phantom{------}NH\end{array}\begin{array}{c}CH_2-CH_2-COOH\\ \diagup\\ \\ \diagdown\\ COOH\end{array} \quad (XV)$$

i.e. a yield of 91% are thus obtained. The compound crystallises with 3 molecules of water.

Analysis for $C_6H_{10}N_3PNa_2O_7 3H_2O$, Calculated: C%, 20.64; H%, 4.04. Found: C%, 20.43; H%, 4.04. Molecular weight: 349.16.

This compound has also been prepared by hydrogenolysis of the compound described in Example 4.

EXAMPLE 7

The disodium salt of Formula XV is prepared from 6.98 parts of the compound of Formula XIV. After addition of hydrochloric acid, 20 parts of a molar solution of calcium chloride are added, and to the solution thus obtained are added 480 parts of ethanol. 6 parts of the calcium salt of posphoryl α-guanidino-glutaric acid of formula:

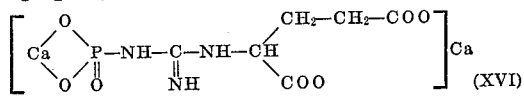

i.e. a quantitative yield, are thus obtained. In order to recrystallise it, it is dissolved in 10 parts of cold water and 40 parts of ethanol are added.

Analysis for $C_{12}H_{18}N_6O_{14}P_2Ca_2 2H_2O$, calculated C% 20.93; H%, 3.22; N%, 12.20; P%, 9.00; Ca%, 17.46. Found: C%, 21.30; H%, 3.98; N%, 12.28; P%, 9.21; Ca%, 17.83. Molecular weight: 688.53.

EXAMPLE 8

The calcium salt of phosphoryl α-guanidino-succinic acid of formula:

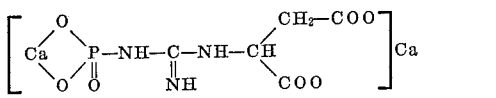

is prepared exactly like that of Example 7 from the compound of Formula X. The yield is quantitative. It is recrystallised by dissolving in cold water and adding ethanol.

Analysis for $C_{10}H_{14}N_6O_{14}P_2Ca_2 2H_2O$, calculated: N%, 12.73; P%, 9.39; Ca%, 18.18. Found: N%, 12.73; P%, 9.31; Ca%, 18.02.

I claim:
1. A compound selected from the group consisting of the acids of the following formula:

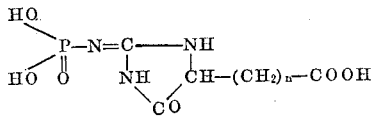

and the alkali metal salts thereof, in which $n$ is 1 or 2.

2. A compound of the formula

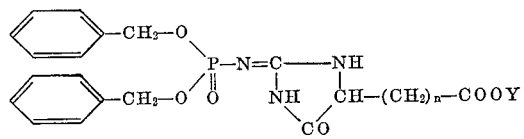

in which $n$ is 1 or 2 and Y represents a member selected from the group consisting of hydrogen and alkali metals.

3. The compound of the formula:

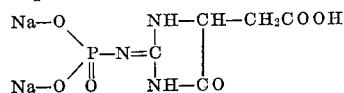

4. The compound of the formula:

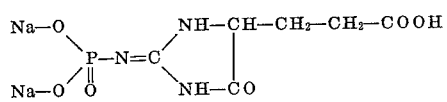

References Cited
UNITED STATES PATENTS
3,036,087   5/1963   Anatol _____ 260—309.7

HENRY R. JILES, *Primary Examiner.*

N. TROUSOF, *Assistant Examiner.*

U.S. Cl. X.R.

167—65; 260—519, 534, 940, 944